Figure 1:
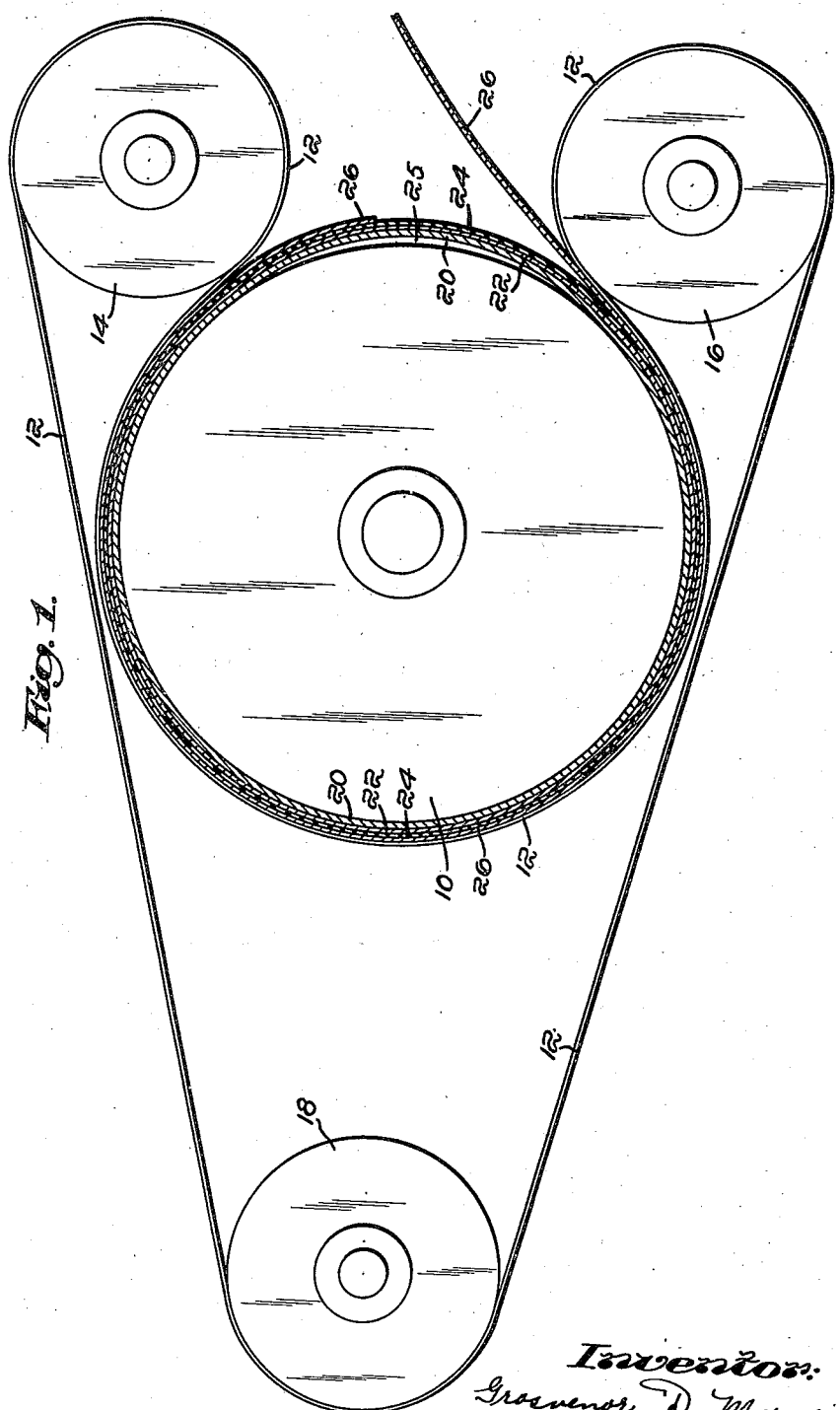

Feb. 9, 1943.　　　G. D. MARCY　　　2,310,642
VULCANIZING APPARATUS
Filed June 26, 1941　　　2 Sheets-Sheet 1

Feb. 9, 1943.　　　G. D. MARCY　　　2,310,642
VULCANIZING APPARATUS
Filed June 26, 1941　　2 Sheets-Sheet 2

Grosvenor D. Marcy
INVENTOR.
BY Kenway & Witter
attorneys

Patented Feb. 9, 1943

2,310,642

UNITED STATES PATENT OFFICE 2,310,642

VULCANIZING APPARATUS

Grosvenor D. Marcy, Newton Highlands, Mass., assignor to Boston Woven Hose & Rubber Company, Cambridge, Mass., a corporation of Massachusetts Application June 26, 1941, Serial No. 399,861

8 Claims. (Cl. 18—6)

My invention relates to vulcanizing apparatus of the general type shown in Reissue Letters Patent No. 20,037, dated July 21, 1936, and issued upon an application of John M. Bierer. This type of machine employs a heated vulcanizing drum and an endless band tensioned against a part of the circumference of the drum, and in the operation of the machine sheet material to be vulcanized is fed continuously under pressure between the band and the heated drum. It is sometimes desired to produce vulcanized sheet stock having a characteristic surface configuration molded therein and heretofore this has been effected by engraving a selected pattern on the metal surface of the drum so that the drum molds the pattern into the sheet material while vulcanization is taking place. The cost of thus engraving a large drum is great and an engraved drum is useful to produce only one pattern.

One object of my invention is to produce a demountable shell mold for use in conjunction with a vulcanizing drum of the type referred to, the mold being so constructed and arranged that it may be removed from the drum and replaced by similar molds of different patterns, thus making possible the interchangeable use of an assortment of shell molds with one drum for producing a variety of patterns from the same machine.

Another object of my invention is to reduce the cost of molding a pattern into material vulcanized in a machine of the type referred to.

Vulcanizing apparatus of the type to which this invention relates often includes a drum which is of large dimensions; for example, it may be five feet in diameter and eighty inches in length. The difficulties of accurately fitting a shell to a drum of this size and of removing and replacing a shell in such a combination are extreme. I have discovered, however, that satisfactory results may be secured by employing a flexible shell fitting the drum with substantial clearance, that is to say, the internal diameter of the shell may be appreciably greater than the exterior diameter of the drum. Thus the shell may be conveniently slipped off or on the drum; and when in use the shell is brought into conformity to the drum surface throughout a considerable length of its circumference by the action of the pressure band. The clearance provided by the dimensions of the shell is meanwhile taken up as a bulge away from the drum surface in the idle portion of the drum, that is to say, the portion of the drum which is not embraced by the pressure band. This bulge, which remains always at the same place in the apparatus, travels around the shell as a wave or wave crest as the shell itself rotates with the drum and beneath the moving pressure band. The combination of a rotary drum with a flexible mold-carrying shell and pressure band in the relation above described is believed to be broadly new and of great value and importance in the art of continuous vulcanization.

One advantage resulting from my invention is that a manufacturer of rubber products in sheet form such as flooring, mats, etc., can place on the market products having different selected attractive designs impressed therein without sacrificing the desirable characteristics obtained from continuous vulcanizing and at a price comparing favorably with smooth rubber products.

In another important aspect my invention consists in a novel process for making interchangeable or replaceable shell molds for use in vulcanizing apparatus.

The process of my invention is characterized by providing a cylindrical shell with an unvulcanized rubber or plastic coating, impressing a pattern into the surface of the unvulcanized rubber coating, and then vulcanizing the rubber to fix permanently its surface configuration with the pattern impressed therein. The process of my invention may be employed with particular advantage in providing a shell mold which is flexible as a whole as herein explained, but is not limited in that respect. It makes available an accurate and relatively inexpensive process for providing a shell mold more rapidly than has been heretofore possible. For illustrative purposes I have herein shown the process of my invention as carried out in providing a mold having a sandpaper surface which is impressed in the rubber layer of the mold from an actual sandpaper pattern. Any other surface configuration may be produced from a corresponding positive pattern.

My invention is not, however, limited to the employment of rubber as a pattern carrying medium, but may be carried out with the assistance of mediums which may be worked at moderate temperatures or by electrolytic deposition.

Figure 2:
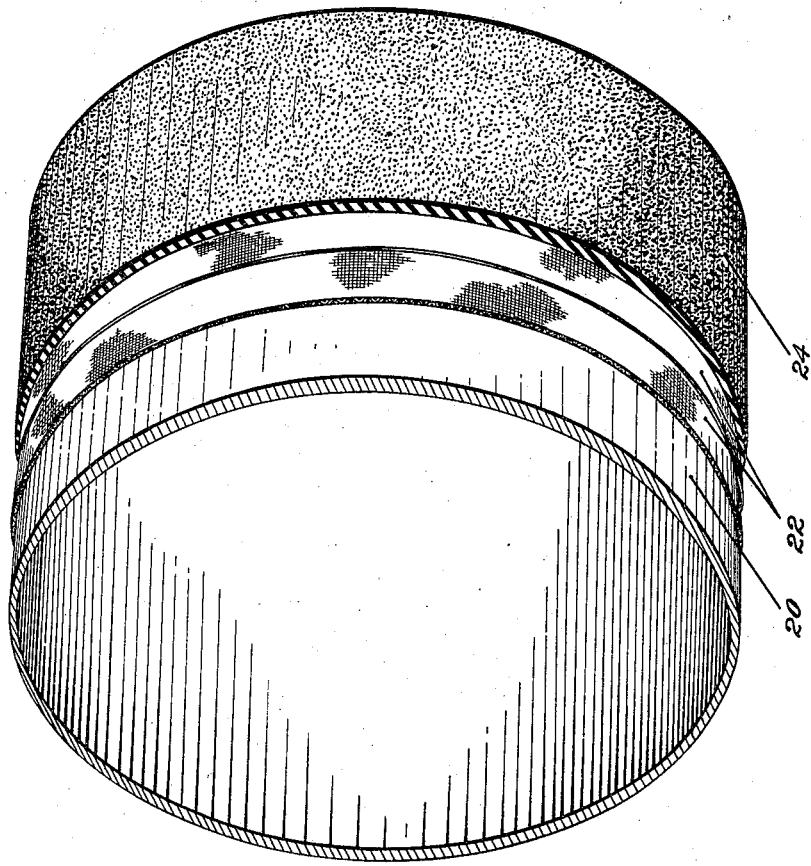

These and other features and objects of my invention will be more readily understood and appreciated from the following detailed description of a preferred embodiment thereof selected for purposes of illustration and shown in the accompanying drawings in which:

Fig. 1 is a diagrammatic view in cross-section showing the process of making the mold, and incidentally the machine or apparatus in which it is employed, and Fig. 2 is a view in perspective of a shell mold constructed according to my invention, parts being broken away to show details of construction.

The general organization of the vulcanizing machine is diagrammatically shown in Fig. 1, where it will appear that a heated rotatable cylindrical drum 10 is partially encircled by a metallic pressure band 12 supported and guided in its path by a pair of rollers 14 and 16 disposed in advance of the drum 10 and a third roller 18 disposed at the rear of the drum 10. The roller 18 is adjustably mounted to provide varying degrees of pressure of the band 12 against the drum. One bearing of the drum is removable to permit an endless belt to be slipped over the drum. The band 12 moves with the drum, the roller 14 being driven from a suitable source.

In one aspect my invention consists in a shell mold placed on the drum to mold a pattern into the surface of rubberized stock held against the surface of the drum. Fig. 2 shows the construction of the mold. A shell 20 is formed preferably by butt-welding the edges of a rolled steel sheet to form a cylinder having an inside diameter slightly larger than the outside diameter of the drum 10. I have found that sheet steel 3/16" thick will form a satisfactory shell having the requisite flexibility in use when used with a drum about 60" in diameter. As a matter of fact the shell 20 is so thin that it will not hold its cylindrical shape without support, but tends to flatten of its own weight. The fact that the shell is slightly larger than the drum is important, since the shell must be capable of relatively easy application to and removal from the drum. For a 5 ft. drum the clearance of the shell should be about 1/8".

After carefully cleaning the shell 20 I coat it with cement and then wind strips of rubberized fabric 22 upon it, the winding being in spirals and very tightly held on the shell. Then I cement upon this foundation a layer of unvulcanized rubber 24 which coats the fabric 22. The dimensions are not critical, but the fabric may conveniently be wound to a thickness of 1/8" or less and the rubber coating may be 1/16" thick.

The choice of a pattern for the mold is of secondary importance, and I will describe the making of a sandpaper surface pattern mold by way of illustration. The rubber coated shell 20 is slipped over the drum 10 and the bearings of the roller 18 are adjusted to tension the band against the drum 20. When this has been done, the shell will hug the drum beneath the pressure band, but will separate and bulge therefrom as shown at 25. In other words the band 12 forces the shell to follow the contour of the drum through a portion of its circumference, the slack being confined to the portion of the shell not held by the band. Rings (not shown) may be secured to the drum to prevent the shell from shifting axially along the drum.

A strip of abrasive cloth 26, or sandpaper, is fed into the machine between the band 12 and the rubber 24 as the drum is slowly rotated. As the heated drum rotates and the band moves along, the cloth 26 is drawn over the surface of the rubber and pressed tightly into it so that the projecting grains are embedded in the rubber. When the leading edge of the cloth approaches the oncoming cloth, the machine is stopped and the cloth 26 is cut to form an edge which abuts closely against the leading edge. This joint must be skillfully made in order to prevent a disfiguring break in the pattern. When the joint has been made, the machine is run until the joint passes under the band on the drum.

The shell 20 with the pattern cloth 26 is then removed from the drum, and then wrapped in fabric, the outer layers of which are wet. Then the wrapped shell is placed in a vulcanizing chamber where the rubber layer 24 is vulcanized. The drying and consequent shrinking of the wet fabric squeezes the abrasive cloth even more tightly against the rubber, and so maintains it during the vulcanizing operation. At the same time the individual abrasive grains are freed from their bond to the cloth backing and when the fabric and cloth 26 are later stripped off, the grains remain in the rubber layer 24 and the pattern of the abrasive cloth has been vulcanized into the surface of the rubber. The granules of sand or abrasive are subsequently scrubbed out of the rubber layer and the shell mold is thus completed and ready for use. The place where the joint came in the pattern cloth is then hand tooled to remove imperfections.

When it is desired to use the mold thus made, the shell is slipped over the drum again, the belt or strip to be vulcanized and molded is led over the shell beneath the pressure band, or the end of it is inserted between the mold and the band, and when the machine is operated the pattern on the mold will be transferred to and vulcanized in the rubber of the product.

It will be understood that shells with a vulcanized rubber coating can be made in a great variety of patterns, according to the relief pattern on the strip of matrix material corresponding to the strip 26 fed into the machine while the rubber is unvulcanized.

An alternative form of the invention consists in a mold comprising a steel shell similar to that described above covered by a layer of solder and an outer pattern-carrying layer of electro-deposited metal forming the mold surface. To make such a mold, copper or other metal is electrolytically deposited on a cathode exhibiting the desired pattern. One convenient form of cathode is a rotatable cylinder of relatively small diameter engraved with the desired design or pattern, upon which metal is continuously deposited and stripped off to form a long thin sheet carrying the pattern. The sheet is soldered to the steel shell, the solder filling the voids of the pattern and uniting the shell and the electro-deposited sheet. The surface area of the cathode cylinder is relatively small, and comparatively soft metal may be used so that it does not become overwhelmingly expensive for a rubber manufacturer to keep on hand a stock of engraved cylinders to serve as cathodes. The solder and the spirally wound fabric 22 previously referred to are analogous, since they are base materials placed on the shell to form a foundation for the pattern carrying medium, viz. rubber or the electro-formed sheet.

It will now be apparent that I have invented a mold for rotary vulcanizing machines, which is relatively light, easily constructed, and which can be manipulated without difficulty. The expense of engraving a vulcanizing drum has been eliminated, and the manufacturing cost of patterned sheet rubber products materially reduced. The process of making the mold is not claimed herein but constitutes the subject matter of my copending continuing application, Ser. No. 448,076, filed January 23, 1942.

Having now described and illustrated my invention, what I claim as new and desire to secure by Letters Patent of the United States is:

1. In combination with a continuous vulcanizing machine employing a heated drum and a pressure band, a demountable mold comprising a thin, flexible, cylindrical shell, and a layer of vulcanized rubber secured to the shell and having a pattern formed in its surface, the shell being dimensioned to slip over the drum and be held against it throughout a portion of its circumference by the pressure band.

2. In a continuous vulcanizing machine employing a heated drum and a pressure band tensioned around a portion of the circumference of the drum, a mold comprising a cylindrical shell having a pattern formed on its surface, the pressure band serving to conform a portion of the shell to the contour of the drum.

3. In a continuous vulcanizing machine employing a heated drum and a pressure band tensioned around a portion of the circumference of the drum, a mold comprising a cylindrical shell of thin flexible material having a pattern formed in its outer surface and having an inside diameter slightly larger than the outside diameter of the drum, whereby the pressure band forces a portion of the shell to conform to the contour of the drum, the remainder of the shell being free to separate from the surface of the drum.

4. A machine for vulcanizing strip material, comprising a drum, a pressure band guided to travel in a path embracing a substantial portion of the circumference of the drum, and a flexible mold-carrying shell removably fitting the drum with clearance and conformed to the drum by the pressure of said band throughout a portion only of the circumference of the drum.

5. A machine for vulcanizing strip material, comprising a drum, a pressure band guided to travel in a path embracing a substantial portion of the circumference of the drum, and a flexible mold-carrying shell removably fitting the drum with clearance and rotatable therewith while a portion of the mold is continuously bulged away from the drum surface by pressure of said band.

6. Apparatus for vulcanizing strip material, comprising a heated drum of rigid structure mounted for rotation, a metallic pressure band guided to travel in a path concentric with a substantial portion of the circumference of the drum and movable therewith, and a flexible mold-carrying shell removably fitting the drum with clearance and rotatable therewith while a portion of the shell is continuously held away from the drum surface by pressure of said band, the said shell having an outer plastic layer with a pattern molded in the contour of its surface.

7. Apparatus for vulcanizing strip material, comprising a heated drum of rigid structure, a pressure band guided to travel in a path concentric with a substantial portion of the circumference of the drum, and a metallic mold-carrying shell removably fitting the drum with clearance and conformed to a substantial portion of the drum circumference by the pressure of said band, the said shell being heated by contact with the drum and having an outer layer of plastic material with a pattern molded in the contour of its surface.

8. Apparatus for vulcanizing strip material, comprising a rotary heated drum, a pressure band, and a cylindrical metal shell fitting the drum with clearance sufficient for ready removal and replacement and pressed into heat conductive relation with a substantial portion of the drum circumference by the pressure of said band, the said shell carrying an intermediate layer of foundation material and an outer molded layer having a pitted surface for molding strip material brought into vulcanizing contact therewith.

GROSVENOR D. MARCY.